N. Jenkins.
Cock. Patented April 18. 1865.
N° 47,309.

Witnesses

Inventor

UNITED STATES PATENT OFFICE.

NATHANIEL JENKINS, OF BOSTON, MASSACHUSETTS.

IMPROVEMENT IN COCKS.

Specification forming part of Letters Patent No. 47,309, dated April 18, 1865.

*To all whom it may concern:*

Be it known that I, NATHANIEL JENKINS, of Boston, in the county of Suffolk and State of Massachusetts, have invented a new and useful Improvement in Faucets; and I do hereby declare that the following is a full, clear, and exact description of the construction and operation of the same, reference being had to the accompanying drawings, forming a part of this specification, in which—

Figure 1:
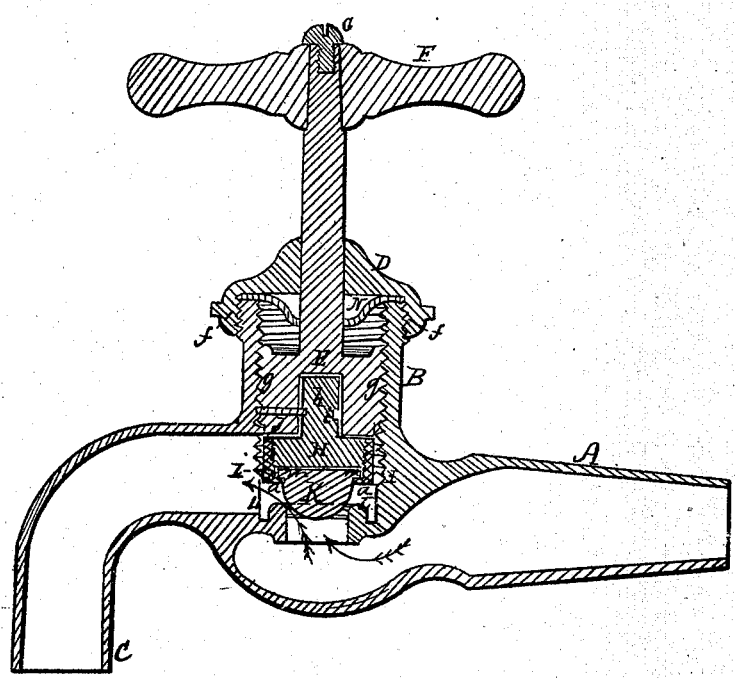
Figure 2:
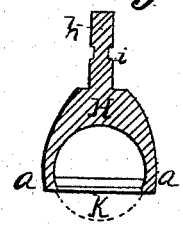

Figure 1 is a vertical longitudinal central section; and Fig. 2 a detached view of the swivel, to the bottom of which the packing is attached.

Like parts are indicated by the same letters in both figures.

The nature of my invention consists, first, in attaching the packing K to the bottom of a plug or swivel, H, which turns with freedom on the bottom of the follower E, to which it is pivoted, so that when said follower is screwed downward and forces the packing onto its seat L the packing and swivel will have no axial motion, and consequently no rubbing, grinding friction on the seat, whereby the packing is rendered much more durable than if it turned and less power is required to operate the faucet; second, in confining the packing to the bottom of the swivel by means of a removable cap or thimble, I, so that it (the packing) can be very readily removed or replaced when required; third, in providing the swivel with a cavity having a contracted orifice, whereby a spherical or otherwise shaped elastic packing may be readily confined.

To enable others skilled in the art to make and use my improvement, I will now proceed to describe its construction and operation.

A is the inlet and C the outlet.

B is a cylindrical chamber for the reception of the follower and its appendages. The inside of this chamber is provided with an internal screw, *g*, to receive the external screw cut on the follower E, as shown in Fig. 1.

D is the cap or cover of the chamber B, to which it is confined by means of the internal and external screw, *f*.

N is a circular diaphragm or packing, of leather or other suitable materal, the periphery of which is pressed fast to the top of the chamber B by means of the cap D, the center of said diaphragm being provided with a round hole, through which the stem of the follower E passes water-tight, whereby any leakage is prevented from the top of the chamber B.

The general shape of the follower E is clearly shown in Fig. 1, F being the handle confined thereto by means of the screw G in the usual manner.

H is the swivel, consisting of a round or cylindrical block of metal, and provided with a shank, *h*, which enters and turns freely in a hole in the center of the follower. The shank *h* is furnished with an encircling-groove, *i*, which the inner end of the pin *j* enters, thereby preventing the swivel from dropping out.

I is a cap or thimble, of any suitable metal, the bottom of which is provided with a flange, *a*. This thimble is confined to the swivel by means of a male and female screw, as represented in Fig. 1; or it may be confined more cheaply by means of a single pin or screw passed through them both.

K is the packing, of rubber or other suitable elastic material, around the upper edge of which is formed a flange, *m*, by means of which and the flange *a* of the thimble I the packing is securely confined to the swivel H. In Fig. 1 the packing is represented as hemispherical. It may, however, be a flat disk, or of any other suitable shape.

L is the circular seat on which the packing rests, its relative size and position being represented in Fig. 1.

Having thus described the construction and operation of my improvement, what I claim as new, and desire to secure by Letters Patent, is—

1. The swivel H, in combination with the follower E and seat L, substantially as and for the purpose described.

2. The combination and arrangement of the thimble I, swivel H, and packing K, substantially as and for the purpose described.

NATHL. JENKINS.

Witnesses:
N. AMES,
N. EVANS, Jr.